United States Patent
Li et al.

(10) Patent No.: US 6,563,679 B1
(45) Date of Patent: May 13, 2003

(54) CURRENT PERPENDICULAR-TO-THE-PLANE MAGNETORESISTANCE READ HEADS WITH TRANSVERSE MAGNETIC BIAS

(75) Inventors: Shuxiang Li, Saku (JP); Satoru Araki, Saku (JP)

(73) Assignee: TDK Corporation, Tokyo (JP)

( * ) Notice: Subject to any disclaimer, the term of this patent is extended or adjusted under 35 U.S.C. 154(b) by 34 days.

(21) Appl. No.: 09/690,827

(22) Filed: Oct. 18, 2000

Related U.S. Application Data
(60) Provisional application No. 60/223,694, filed on Aug. 8, 2000.

(51) Int. Cl.[7] .................................................. G11B 5/39
(52) U.S. Cl. ...................................................... 360/324
(58) Field of Search .............................. 360/324, 324.1, 360/324.11, 324.12, 324.2, 327.1, 327.2, 327.22, 327.23, 327.3, 327.31, 327.32

(56) References Cited

U.S. PATENT DOCUMENTS

| | | | | |
|---|---|---|---|---|
| 4,277,808 A | * | 7/1981 | Nagaki | 324/252 |
| 4,987,508 A | * | 1/1991 | Smith | 360/327.23 |
| 5,428,491 A | * | 6/1995 | Smith | 360/327.31 |
| 5,627,704 A | | 5/1997 | Lederman et al. | 360/321 |
| 5,668,688 A | | 9/1997 | Dykes et al. | 360/324.1 |
| 5,784,224 A | * | 7/1998 | Rottmayer et al. | 360/324 |
| 5,880,912 A | * | 3/1999 | Rottmayer | 360/324 |
| 5,883,763 A | * | 3/1999 | Yuan et al. | 360/324 |
| 5,898,548 A | * | 4/1999 | Dill et al. | 360/319 |
| 6,005,753 A | | 12/1999 | Fontana, Jr. et al. | 360/324.2 |
| 6,023,395 A | * | 2/2000 | Dill et al. | 360/324.2 |

OTHER PUBLICATIONS

Baibich et al., "Giant Magnetoresistance of (001) Fe/(001)Cr Magnetic Superlattices", Physical Review Letters, 1988 The American Physical Society, vol. 61, No. 21, pp. 2472–2475 (Nov. 21, 1988).

Dauguet et al., "Angular Dependence of the Perpendicular Giant Magnetoresistance of Multilayers", 1996 The American Physical Society, vol. 54, No. 2, pp. 1083–1087 (Jul. 1, 1996–II).

Dieny et al., "Giant Magnetoresistance in Soft Ferromagnetic Multilayers", Physical Review B, 1991 The American Physical Society, vol. 43, No. 1, pp. 1297–1300 (Jan. 1, 1991).

Pratt et al., Perpendicular Giant Magnetoresistances of Ag/Co Multilayers, Physical Review Letters, 1991 The American Physical Society, vol. 66, No. 23, pp. 3060–3063 (Jun. 10, 1991).

* cited by examiner

Primary Examiner—David L. Ometz
(74) Attorney, Agent, or Firm—Morgan, Lewis & Bockius LLP

(57) ABSTRACT

A current perpendicular-to-the-plane magnetoresistance (CPP-MR) read head includes a top shield and a bottom shield formed of magnetically shielding, electrically-conductive material. A multilayer magnetoresistance (MR) structure is disposed between the top shield and the bottom shield. The MR structure is in electrical contact with the top and bottom shields. A transverse magnetic field generating structure is adjacent the MR structure to transversely, magnetically bias the MR structure. The transverse magnetic field generating structure includes two permanent magnets on either side of the MR structure, and a T-shaped soft magnetic layer to direct magnetic flux from the magnets to the MR structure. In this manner, the read head provides a strong and uniform transverse magnetic bias to the MR structure.

23 Claims, 3 Drawing Sheets

CURRENT PERPENDICULAR-TO-THE-PLANE MAGNETORESISTANCE READ HEADS WITH TRANSVERSE MAGNETIC BIAS

This application claims the benefit of a provisional application, which was filed on Aug. 8, 2000 and assigned Provisional Application No. 60/223,694, which is hereby incorporated by reference.

BACKGROUND OF THE INVENTION

1. Field of the Invention

The present invention relates to giant magnetoresistance ("GMR") transducers or read heads for reading magnetic signals from magnetic recording media, and more particularly, to current perpendicular-to-the-plane giant magnetoresistance ("CPP-GMR") designs. While the invention finds particular application in conjunction with reading hard disk drives, the invention can be implemented with other magnetic storage media. Moreover, the invention can be implemented in other magnetic field detection devices as well as in other devices and environments.

2. Description of the Related Art

Giant magnetoresistance (GMR) was initially described by Baibich et al. in Physical Review Letters, Volume 61, No. 21, pp. 2472–2475 (1988), which is hereby incorporated by reference. GMR occurs when an application of an external field causes a variation in the relative orientation of the magnetizations of neighboring ferromagnetic layers. This in turn causes a change in the spin-dependent scattering of conduction electrons, thereby changing the electrical resistance of the structure. The discovery of GMR triggered a wide study of transport properties of magnetic multilayers. In most cases, the current flows-in-the plane of the layers, called CIP-MR.

Pratt et al. extended the GMR measurements to the case where the current flows perpendicular-to-the-plane, called CPP-MR as described in Pratt et al., Physical Review Letters, Volume 66, pp. 3060 (1991), which is hereby incorporated by reference. In general, the CPP-MR effect is several times larger than the CIP-MR effect. For MR read head applications, the CPP-MR element has to be dramatically scaled down (<100 nm) because of the very small specific resistance of the MR element with the CPP configuration.

In both CIP-MR and CPP-MR, the application of an external field causes a variation in the relative orientation of the magnetizations of neighboring ferromagnetic layers. This in turn causes a change in the spin-dependent scattering of conduction electrons and thus the electrical resistance of the structure. Theoretically, the resistance for CPP multilayers with a unique type of magnetic layer varies approximately as $R(\theta)/R_{ap}=1-a\cdot\cos^2(\theta/2)$, where $R(\theta)$ is the resistance in an external field, $R_{ap}$ (ap refers to antiparallel) is the resistance at zero field, θ is the angle between the magnetization of successive or neighboring magnetic layers, and 0<a<1. Dauguet et al., Physical Review B, Volume 54, pp. 1083–87 (July 1996). Thus, the resistance versus magnetic field for a CPP multilayer is a typical parabolic curve. As a result, in order to apply CPP-MR for MR heads, a transverse magnetic bias to the CPP multilayer is required.

SUMMARY OF THE INVENTION

Accordingly, the present invention is directed to a CPP-MR read head with novel transverse magnetic bias that substantially obviates one or more of problems due to limitations and disadvantages of the related art.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a CPP-MR head includes a top shield and a bottom shield formed of magnetically shielding, electrically-conductive material. A multilayer magnetoresistance (MR) structure is disposed between the top shield and the bottom shield. The MR structure is in electrical contact with the top and bottom shields. A transverse magnetic field generating structure is adjacent the MR structure to transversely, magnetically bias the MR structure.

In another aspect of the present invention, a method of magnetically biasing a CPP-GMR read head is provided. The read head includes a multilayer GMR structure comprising a bilayer portion represented by $[F/NM]_n$, where F represents a ferromagnetic material, NM represents a non-magnetic material, and n is an integer greater than or equal to 2 referring to the number of times the bilayer is repeated. The GMR structure is transversely magnetically biased using at least one magnet. Magnetic flux of the magnet is directed through the GMR structure using a soft magnetic layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
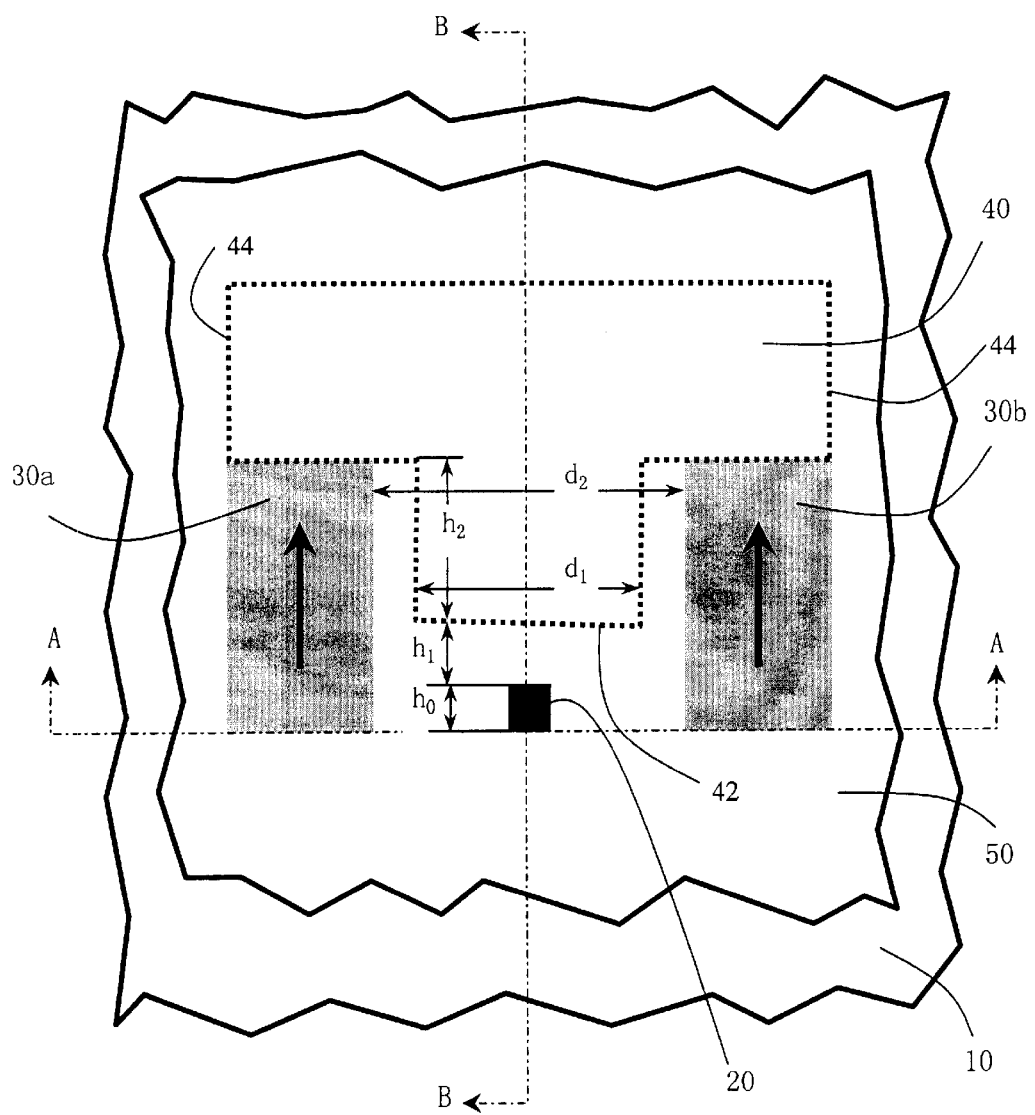
FIG. 1 is a top schematic view of one embodiment of the CPP-MR head of the present invention.

FIG. 1 is a top schematic view of one embodiment of the present invention. A CPP-MR multilayer structure, pillar, or sensor 20 is placed in between two shields (bottom shield 10 and top shield 50). Preferably, the MR structure has a top surface area of less than or equal to 0.1×0.1 µm² and a thickness in a range of 10 nm to 100 nm. The shields may be any magnetically-shielding, electrically-conductive material such as NiFe, NiFeX (where X=Cr, Ta, Nb, Zr, and/or Mo), CoZrNb or CoZrTa.

Two permanent magnets 30a and 30b are disposed adjacent opposite side edges of the MR pillar 20. A T-shape soft magnetic layer 40 is disposed such that a center portion or stem 42 is adjacent a back edge of the MR pillar 20 and two side portions 44 of the magnetic layer are connected to or are contiguous with the two magnets. Preferably, a length or height of the stem of the T-shape soft magnetic layer is less than 5 μm. The permanent magnets and soft magnetic layer provide a transverse magnetic bias field to the MR pillar. The arrangement of the permanent magnets and the soft magnetic layer desirably directs magnetic flux to the MR pillar. Preferably, the MR pillar is positioned symmetrically with respect to a width d, of the stem such that a center of the width of the stem and a center of a width of the MR pillar are in a line perpendicular to the line A—A. Further, preferably, a separation $d_2$ between the two permanent magnets is less than 5 μm.

An oxide layer (not shown) separates and electrically isolates the edges of the MR pillar from the two permanent magnets and the soft magnetic layer. In this embodiment, no ferromagnetic layer is located at a front edge of the CPP multilayer pillar 20. The front edge of the CPP pillar as well as the front edges of the permanent magnets will be the site of an air-bearing surface ("ABS"), denoted by the dashed line A—A, after machining of the MR head. During operation, the ABS will face a magnetic recording medium. In this manner, magnetic flux from transitions recorded in the magnetic medium will be detected by the MR pillar. In an alternative embodiment, the front edge of the MR pillar can be recessed from the ABS and the flux brought to the recessed front edge of the pillar by means of a flux guide.

The two permanent magnets are initialized in a direction (as shown by arrows in FIG. 1) perpendicular or orthogonal to the ABS. Thus, the soft magnetic layer 40 brings the magnetic field from the two permanent magnets to the MR pillar 20 in a direction perpendicular to the ABS, called transverse magnetic bias. The operating point of the CPP-MR heads can be optimized by adjusting 1) the separation $h_1$ between the MR pillar and the front edge of the stem of the soft magnetic layer, and 2) the width $d_1$ of the stem of the soft magnetic layer located in between the two permanent magnets.

Figure 2A:
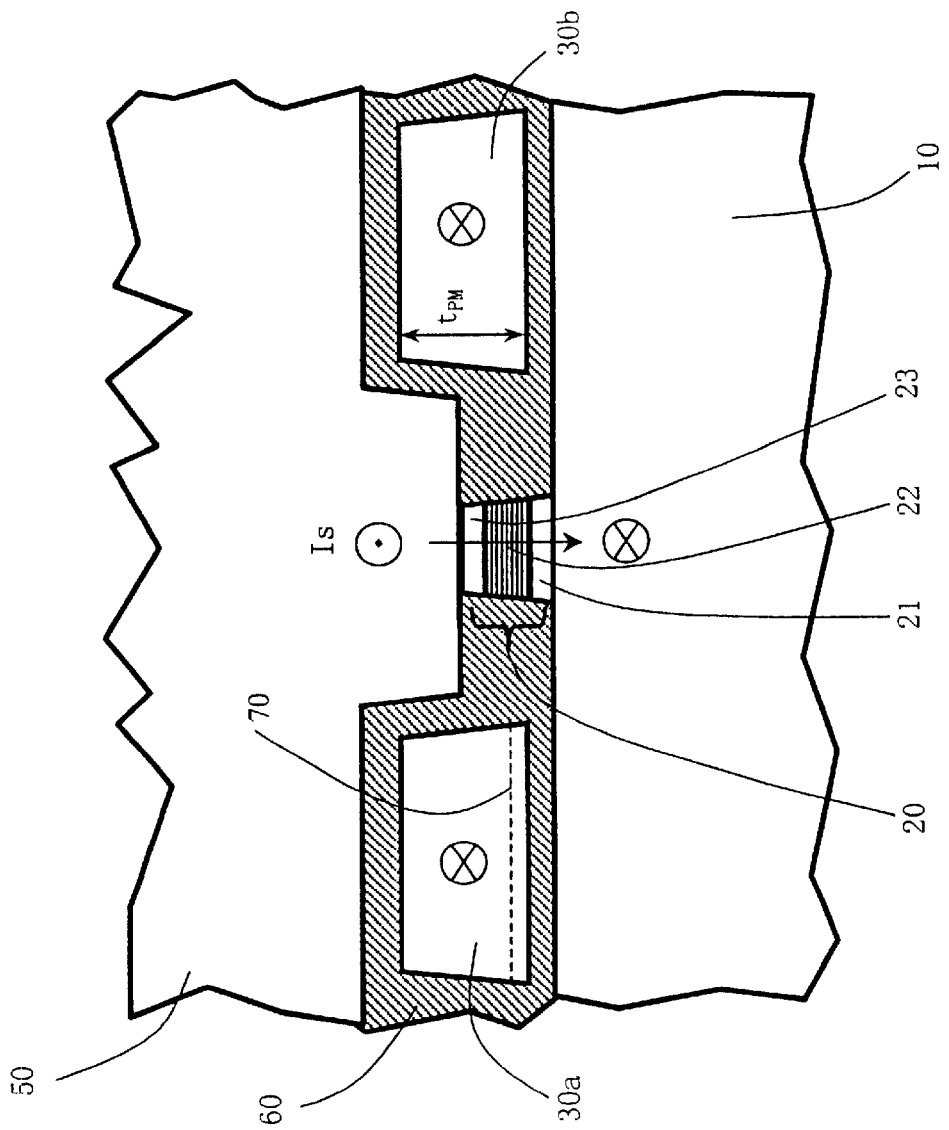
FIG. 2a is a schematic cross-sectional view of the embodiment from an air bearing surface (ABS) or line A—A of FIG. 1.

FIG. 2a is a cross-sectional front or ABS view of the embodiment shown in FIG. 1. The two shields 10 and 50 are isolated from each other by an oxide 60 made of $Al_2O_3$ or $SiO_2$. The shields are electrically connected with the MR pillar 22 through two nonmagnetic metal gaps 21 and 23. Thus, a sense current Is carried by the two shields flows through the MR pillar in a current perpendicular-to-the-plane configuration, as represented by an arrow in FIG. 2 extending through the pillar. The two permanent magnets 30a and 30b are embedded inside the oxide 60 and are disposed adjacent and opposite either side of the MR pillar. In order to achieve transverse magnetic bias, the permanent magnets are initialized perpendicular to the ABS. In an alternative embodiment, each of the permanent magnets are deposited on top of an underlayer 70 made of Cr, Ta, or CrTa.

In the preferred structure, the MR pillar includes a repeated bilayer portion represented by $[F/NM]_n$, where F represents a ferromagnetic material, NM represents a nonmagnetic material, such as a noble metal, and n refers to a bilayer number, which is an integer greater than or equal to 2. At zero magnetic field, neighboring F layers are antiferromagnetically coupled. The $[F/NM]_n$ portion is deposited on top of a buffer layer such as Ta, NiCr, or NiFeCr. A thickness of the MR pillar is in the range of 10 nm to 100 nm, preferably less than 50 nm. Also, the ferromagnetic layer is made of Co or Co-based alloys such as CoFe, CoFeB, and NiFeCo, and the nonmagnetic layer is made of Cu, Ag, or Cu-based alloys. The metal gaps are made of Cu, Ag, Au, or α-Ta. The permanent magnets are selected from Co-α$Fe_2O_3$, CoPt, CoCrPt, and CoCrTaPt. The soft magnetic layer is selected from NiFe, where NiFeX (X=Cr, Ta, Nb, Zr, and/or Mo), CoZrNb and CoZrTa.

Figure 2B:
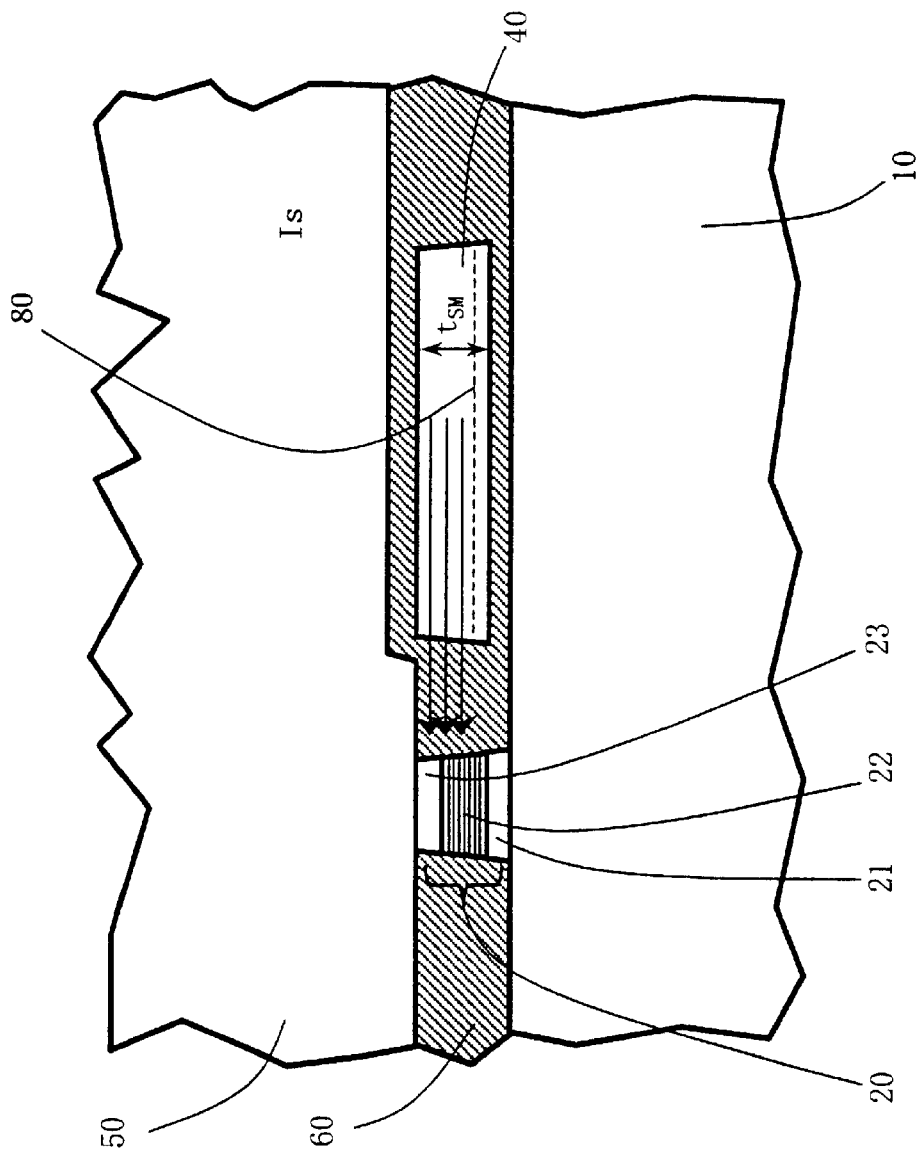
FIG. 2b is a schematic cross-sectional side view of the embodiment from a line B—B of FIG. 1.

FIG. 2b is a cross-sectional view along line B—B of FIG. 1. The soft magnetic layer 40 embedded in oxides 60 is disposed in between the two shield 10 and 50, and is separated from the MR structure with a separation $h_1$. In an alternative embodiment, the soft magnetic layer is deposited on top of an underlayer 80 made of Ta, NiCr or NiFeCr. The soft magnetic layer is thicker than the GMR multilayer and the bottom part of the T-shape soft magnetic layer is wider than the GMR multilayer. The magnetic field from the permanent magnets is brought to the GMR multilayer by the soft magnetic layer in a direction represented by the arrows, which are perpendicular to the ABS, i.e., transverse magnetic bias. The strength of transverse magnetic bias to the GMR multilayer can be adjusted by adjusting 1) the separation $h_1$ between the GMR multilayer and the front edge of the stem of the T-shape soft magnetic layer, and/or 2) the material and the thickness of the soft magnetic layer and permanent magnets. The uniformity of the transverse magnetic bias to the GMR multilayer can be assured by patterning the soft magnetic layer such that the width $d_1$ of the stem is wider than a width of the MR head (and thus wider than a trackwidth of the magnetic recording medium with which the head will be used).

In developing and evaluating the invention, various tests were performed which will now be discussed. These tests show additional preferable features of the invention. First, the output, asymmetry, and signal-to-noise ratio SNR versus the separation $h_1$, i.e., the distance between the GMR multilayer and the stem of the T-shape soft magnetic layer, was investigated. Each of Tables 1-1 to 1-3 below shows test results for heads designed for an areal density over 100 Gbit/$in^2$. Further, each of Tables 1-1 to 1-3 shows the results using an MR pillar having length and width dimensions (as seen in the top view of FIG. 1) of 0.1×0.1 $μm^2$, 0.08×0.08 $μm^2$, and 0.06×0.06 $μm^2$, respectively. The definitions of $d_1$, $d_2$, $h_2$, $t_{PM}$ and $t_{SM}$ are denoted in FIG. 1, FIG. 2a and FIG. 2b. Ref. CIP refers to a reference CIP MR structure. The MR multilayer pillar tested comprised a structure of NiCr3/[CoFe2.5/Cu2]$_{10}$ (where the stated thickness is in nm). As shown in the Tables, for the three different dimension heads, the output and asymmetry are good with $h_1$ of 0.6 μm or 1.0 μm. Thus, in the present invention, $h_1$ is preferably in the range of 0.05 μm to 2.0 μm, and more preferably in the range of 0.5 μm to 1.0 μm.

TABLE 1-1

| | 0.1 × 0.1 $μm^2$ | | |
|---|---|---|---|
| h1 (μm) | output (mV/μm) | Asym (%) | SNR (dB) |
| 0.3 | 11.6 | −4.7 | 26.9 |
| 0.6 | 12.9 | 0.6 | 28.6 |
| 1 | 12.4 | 0.9 | 27.9 |
| 1.5 | 13.5 | 4.2 | 29.4 |
| Ref. CIP | 8.1 | 0.7 | 23.9 |

TABLE 1-2

| | 0.08 × 0.08 $\mu m^2$ | | |
|---|---|---|---|
| h1 ($\mu m$) | output (mV/$\mu m$) | Asym (%) | SNR (dB) |
| 0.3 | 15.3 | −5.9 | 27.2 |
| 0.6 | 17.5 | 0.5 | 29.5 |
| 1 | 16.9 | 0.7 | 23.9 |
| 1.5 | 18.6 | 3.5 | 30.7 |
| Ref. CIP | 10.5 | 0.5 | 24.5 |

TABLE 1-3

| | 0.06 × 0.06 $\mu m^2$ | | |
|---|---|---|---|
| h1 ($\mu m$) | output (mV/$\mu m$) | Asym (%) | SNR (dB) |
| 0.3 | 22.3 | −7.2 | 28.2 |
| 0.6 | 23.3 | 0.9 | 29.0 |
| 1 | 23.7 | 1.3 | 29.3 |
| 1.5 | 24.1 | 3.2 | 29.6 |
| Ref. CIP | — | — | — |

Next, the output, asymmetry, and SNR versus the width $d_1$ of the stem of the soft magnetic layer was investigated. Each of Tables 2-1 to 2-3 below shows test results for heads designed for an areal density over 100 Gbit/in². Further, each of Tables 2-1 to 2-3 shows the results using an MR pillar having length and width dimensions (as seen from top view of FIG. 1) of 0.1×0.1 $\mu m^2$, 0.08×0.08 $\mu m^2$, and 0.06×0.06 $\mu m^2$, respectively. The definitions of $d_1$, $d_2$, $h_2$, $t_{PM}$ and $t_{SM}$ are denoted in FIG. 1, FIG. 2a and FIG. 2b. Ref. CIP refers to a reference CIP MR structure. The MR multilayer pillar tested comprised a structure of NiCr3/[CoFe2.5/Cu2]$_{10}$ (where the stated thickness is in nm). As shown in the Tables, the width $d_1$ of the stem of the soft magnetic layer is preferred to be at least 10 times of width of the MR pillar.

TABLE 2-1

| | 0.1 × 0.1 $\mu m^2$ | | |
|---|---|---|---|
| d1 ($\mu m$) | output (mV/$\mu m$) | Asym (%) | SNR (dB) |
| 0.2 | 10.7 | 3.1 | 25.7 |
| 0.5 | 11.3 | 1.7 | 26.5 |
| 0.8 | 12.2 | 0.9 | 27.7 |
| 1 | 12.9 | 0.6 | 28.6 |
| Ref. CIP | 8.1 | 0.7 | 23.9 |

TABLE 2-2

| | 0.08 × 0.08 $\mu m^2$ | | |
|---|---|---|---|
| d1 ($\mu m$) | output (mV/$\mu m$) | Asym (%) | SNR (dB) |
| 0.2 | 16.0 | 2.9 | 27.9 |
| 0.5 | 16.2 | 1.3 | 28.2 |
| 0.8 | 16.9 | 0.7 | 28.9 |
| 1 | 17.5 | 0.5 | 29.5 |
| Ref. CIP | 10.5 | 0.5 | 24.5 |

TABLE 2-3

| | 0.06 × 0.06 $\mu m^2$ | | |
|---|---|---|---|
| d1 ($\mu m$) | output (mV/$\mu m$) | Asym (%) | SNR (dB) |
| 0.2 | 23.6 | 2.6 | 29.2 |
| 0.5 | 23.1 | 0.7 | 28.8 |
| 0.8 | 22.7 | 0.5 | 28.5 |
| 1 | 23.3 | 0.9 | 29.0 |
| Ref. CIP | — | — | — |

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

What is claimed is:

1. A current perpendicular-to-the-plane magnetoresistance (CPP-MR) read head, comprising:
    a top shield formed of magnetically shielding, electrically-conductive material;
    a bottom shield formed of magnetically shielding, electrically-conductive material;
    a multilayer magnetoresistance (MR) structure disposed between the top shield and the bottom shield, the MR structure being in electrical contact with the top and bottom shields; and
    a transverse magnetic field generating structure provided adjacent the MR structure in a direction to apply a transverse magnetic biasing field to the MR structure, the direction being perpendicular to a direction along which the MR structure is layered and parallel to an air bearing surface (ABS),
    wherein the transverse magnetic field generating structure includes a permanent magnet, and
    wherein the transverse magnetic field generating structure further includes a soft magnetic layer in magnetic contact with the permanent magnet.

2. The CPP-MR read head according to claim 1, wherein the MR structure comprises a bilayer portion represented by [F/NM]$_n$, where F represents a ferromagnetic material, NM represents a non-magnetic material, and n is an integer greater than 1 referring to the number of times the bilayer is repeated.

3. The CPP-MR head according to claim 1, further comprising a first nonmagnetic metal gap to electrically interconnect the top shield with the MR structure and a second nonmagnetic metal gap to electrically interconnect the bottom shield with the MR structure.

4. The CPP-MR head according to claim 1, wherein the MR structure has a thickness in a range of 10 nm to 100 nm.

5. The CPP-MR head according to claim 1, wherein a top surface area of said MR structure is less than or equal to 0.1×0.1 $\mu m^2$.

6. The CPP-MR head according to claim 1, wherein the transverse magnetic field generating structure includes two permanent magnets, each adjacent opposite sides of the MR structure.

7. The CPP-MR head according to claim 6, wherein a separation between the two permanent magnets is less than 5 $\mu m$.

8. The CPP-MR head according to claim 1, wherein the permanent magnet includes one or more of Co-$\alpha Fe_2O_3$, CoPt, CoCrPt, and CoCrTaPt.

9. The CPP-MR head according to claim 1, wherein the permanent magnet is deposited on top of an underlayer including one or more of Cr, Ta, and CrTa.

10. The CPP-MR head according to claim 1, wherein a separation between the soft magnetic layer and the MR structure is in a range of 0.05 µm to 2.0 µm.

11. The CPP-MR head according to claim 1, wherein the transverse magnetic field generating structure includes two permanent magnets, each adjacent opposite sides of the MR structure, the soft magnetic layer being disposed behind the MR structure, opposite ends of the soft magnetic layer being in magnetic contact with the two permanent magnets.

12. The CPP-MR head according to claim 1, wherein the soft magnetic layer includes a stem extending from a general center of the soft magnetic layer such that the layer forms a general T-shape, the stem being located behind the MR structure.

13. The CPP-MR head according to claim 12, wherein the permanent magnets and T-shape soft magnetic layer are positioned to form generally an m-shape.

14. The CPP-MR head according to claim 12, wherein a front face of the stem is wider than the MR structure.

15. The CPP-MR head according to claim 12, wherein a height of the stem is less than 5.0 µm.

16. The CPP-MR head according to claim 1, wherein the soft magnetic layer includes one or more of NiFe, NiFeX (where X is one or more of Cr, Ta, Nb, Zr, and Mo), CoZrNb, and CoZrTa.

17. The CPP-MR head according to claim 1, wherein said soft magnetic layer is deposited on top of an underlayer including one or more of Ta, NiCr, and NiFeCr.

18. The CPP-MR head according to claim 1, wherein a thickness of the soft magnetic layer is greater than a thickness of the MR structure.

19. A method of magnetically biasing a current perpendicular-to-the-plane magnetoresistance (CPP-MR) read head, which includes a multilayer GMR structure, comprising:

generating a magnetic flux using a magnet; and leading the magnetic flux to the GMR structure using a soft magnetic layer as a magnetic flux pass, thereby applying a transverse magnetic biasing field to the GMR structure, wherein the step of transversely magnetically biasing the GMR structure includes using at least two permanent magnets, and wherein the step of directing the magnetic flux further includes extending a portion of the soft magnetic layer towards the MR structure.

20. The method according to claim 19, wherein the step of transversely magnetically biasing the GMR structure includes using at least two permanent magnets disposed on either side of the GMR structure and wherein the step of directing the magnetic flux includes magnetically contacting the soft magnetic layer to the at least two permanent magnets.

21. A current perpendicular-to-the-plane giant magnetoresistance (CPP-GMR) read head having an air bearing surface (ABS), comprising:

a pair of magnetic shields defining a read gap;

a giant magnetoresistance (GMR) pillar disposed between the pair of magnetic shields in the read gap, the pair of magnetic shields serving as electrical contacts for the GMR pillar;

a first permanent magnet adjacent the GMR pillar;

a soft magnetic layer in magnetic contact with the first permanent magnet, the soft magnetic layer directing magnetic flux from the first magnet to the GMR pillar in direction orthogonal to the ABS, a thickness of the soft magnetic layer being greater than a thickness of the GMR pillar.

22. The CPP-GMR read head according to claim 21, further comprising a second permanent magnet in magnetic contact with the soft magnetic layer, the soft magnetic layer directing magnetic flux from the second magnet to the GMR pillar in a direction orthogonal to the ABS.

23. The CPP-GMR head according to claim 22, wherein the soft magnetic layer has a general T-shape including a stem extending from a general center of the soft magnetic layer, the stem being located behind the MR structure.

* * * * *